INVENTORS
Rupert H. Draeger
Herbert Friedman
BY
Wm Glenn Jones
ATTORNEY

INVENTORS
Rupert H. Draeger
Herbert Friedman
BY
ATTORNEY

Patented Jan. 31, 1950

2,495,708

UNITED STATES PATENT OFFICE 2,495,708

ELECTRICALLY CONTROLLED FLICKER FUSION TESTING APPARATUS

Rupert H. Draeger, United States Navy, and Herbert Friedman, Arlington, Va.

Application March 24, 1944, Serial No. 527,992

1 Claim. (Cl. 250—36)

(Granted under the act of March 3, 1883, as amended April 30, 1928; 370 O. G. 757)

This invention relates to a new method and apparatus for the convenient and accurate determination of the flicker fusion threshold.

The flicker fusion threshold may be defined either as the least number of flashes of light per second which are perceived by the eye as a steady light or the greatest number of flashes of light per second which are perceived as a flashing or flickering light. The flashing light which is used to determine the flicker fusion threshold will hereafter be referred to as the test field. The flicker fusion threshold is ordinarily determined by allowing an image of the test field to fall upon some portion of the retina of the eye. The number of flashes of light per second is varied until the flicker fusion threshold is determined.

The flicker fusion threshold is affected by such factors as light intensity, retinal position, area of the test field, and state of adaptation of the eye to light. At the lowest perceptible brightness the flicker fusion threshold is around 3 flashes per second and increases with increasing light intensity to around 60 flashes per second at the highest light intensity that the eye can tolerate. The periphery of the retina is more sensitive to flicker than the central portion, therefore, the flicker fusion threshold is increased when the retinal image of the test field is shifted from the center to the periphery. Increasing the size of the test field likewise increases the flicker fusion threshold since, in effect, this is equivalent to moving the light to a peripheral retinal position. Similarly, the state of adaptation for the particular light intensity employed in the test field will alter the flicker fusion threshold. When the light intensity of the test field is increased the flicker fusion threshold will be increased. Conversely, when the light intensity of the test field is decreased, the flicker fusion threshold will be decreased. The final flicker fusion threshold for the particular light intensity is not reached until the eye has become adapted to that light intensity. In some cases this may require as much as thirty minutes. There is also a variation of the flicker fusion threshold between individuals of 3 to 10 flashes per second which varies slightly from day to day.

In addition to the above enumerated variations of the flicker fusion threshold, there are also variations which are brought about by abnormal conditions. The most striking example is the decrease in the flicker fusion threshold which occurs with anoxia. Anoxia may be brought about in various ways such as ascent into a rarefied atmosphere high above the earth; breathing of air with a lowered oxygen content, or by any pathological condition which interferes with the transportation to, or utilization of oxygen by the tissues of the body. For example, an ascent of 20,000 feet above the surface of the earth will result in the lowering of the flicker fusion threshold of about 5 flashes per second. The breathing of a nitrogen-oxygen mixture containing 10 percent oxygen for 10 minutes likewise will result in a lowering of flicker fusion threshold of about 5 flashes per second. An individual suffering from heart disease when decompensated will have a lowered flicker fusion threshold. An improvement in his condition will be indicated by a return of the flicker fusion threshold to a higher level. Various states of fatigue and exhaustion, both mental and physical, also have their effect on the flicker fusion threshold.

It is an object of this invention to provide a simple and accurate method of determining the flicker fusion threshold.

Heretofore, two general methods, mechanical and electrical, have been used to determine the flicker fusion threshold. The mechanical method essentially involves the use of a scanning sector disc driven by a variable speed motor and a light source so positioned as to be interrupted by the sector disc. The mechanism included means for determining the speed of the disc when the flicker fusion threshold is reached. The electrical method involved the use of some form of electrical impulse generator and an electrical discharge tube as light source. This apparatus consisted of an electronic oscillator, the frequency of which was controlled by a selector switch.

The present invention pertains to a simplified, compact, rugged, and accurate apparatus for the determination of the flicker fusion threshold. In order to more readily explain this invention there is shown in the accompanying drawing a preferred embodiment in which Fig. 1 is a schematic diagram of the electrical circuit.

Figure 1:
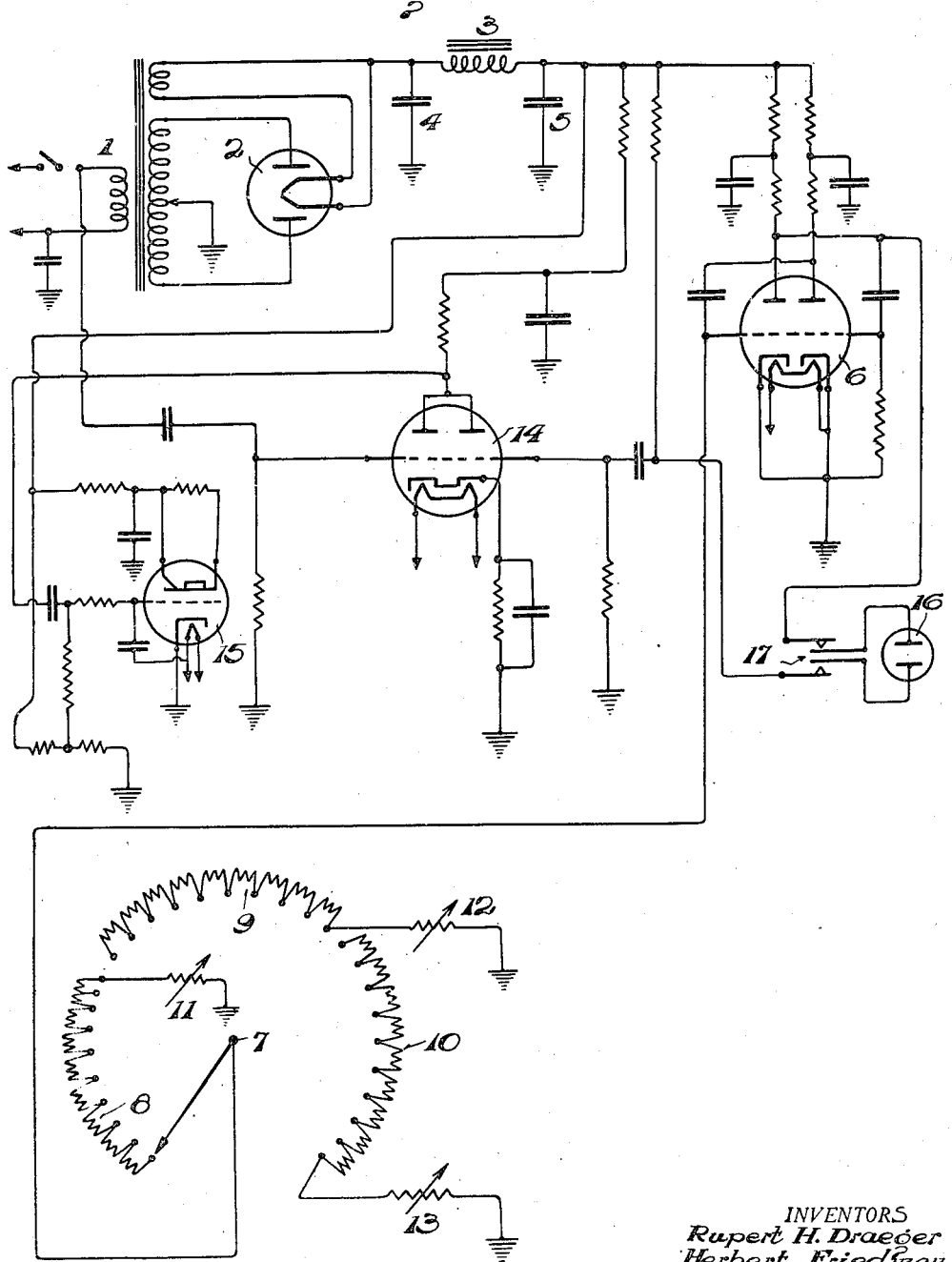

The electrical circuit shown diagrammatically in Fig. 1 includes a direct current power supply, multivibrator with frequency selected switch, neon lamp light source, mixer tube, and electron ray indicator tube.

The multivibrator offers the required stability of operation in an extremely simple device. The use of a multivibrator at the required frequencies has several advantages over other forms of oscillators and requires only a double triode in a single tube envelope with capacitance and resistance circuit elements. The frequency of a multivibrator is essentially independent of heater and plate voltage changes resulting from normal line voltage variations. It is relatively insensitive to normal differences in tube characteristics making it possible to replace tubes without recalibration.

The power supply is of the conventional type of which 1 is a power transformer, connected in the usual way to the full wave rectifier 2 and the filter choke 3 and filter condensers 4 and 5.

The multivibrator 6 is a twin triode with regenerative coupling. Its action is that of a conventional multivibrator, the frequency of which is controlled by varying one of the grid leak resistors. This control is effectively exercised by introducing the proper resistance 7 in the grid circuit.

The resistor 7 comprises a thirty-one tap selector switch for varying the pulse frequency of the multivibrator in integral steps from thirty to sixty pulses per second. This switch is built in three sections of fixed resistors designated respectively as 8, 9 and 10. Each section is connected in series with variable resistors 11, 12 and 13, which are capable of adjusting the frequency of the entire section.

The relatively stable 60 cycle frequency, 110 volt of the city power lines provides a convenient reference standard for the calibration of the impulse generator. In order to accomplish this calibration a double triode mixer tube 14 is capacitively excited by pulses from the multivibrator applied to one grid and the 60 cycle voltage likewise applied to the other grid. The mixed frequencies appearing in the plate circuit of tube 14 are applied to the grid of electron ray indicator tube 15. By observing the beat frequencies, as indicated by the electron ray tube, one may adjust each of the three resistor sections to proper frequency with the aid of variable resistors 11, 12 and 13. If this simple adjustment is made after allowing the multivibrator to warm up the frequency may be expected to remain constant within practical limits. The beat frequency of the multivibrator and 60 cycle frequency may, if desired, be indicated by other means. For example, an alternating current meter may be inserted in the plate circuit of the mixer tube or a pair of earphones similarly used to indicate resonance frequency.

The light source 16 may conveniently be any suitable gas discharge tube such as a one watt neon lamp which plugs into jack 17. The neon lamp should be chosen to give a uniform glow over a field approximately one-quarter inch in diameter. In the preferred embodiment, the neon bulb is shielded so as to emit light through a small central aperture. This may readily be done by simply blackening part of the bulb, as shown at 18 so as to leave a small aperture 19 as the test field.

Figure 2:
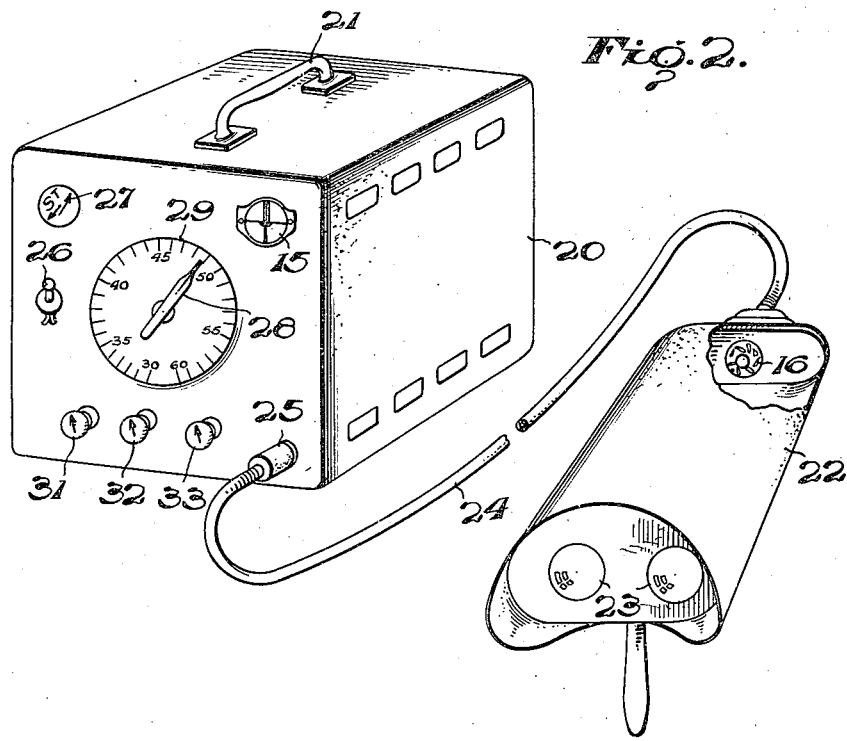
Fig. 2 is a perspective drawing of the electrical impulse generator and light source.

The flicker fusion threshold determining apparatus may be constructed in a simple, compact and portable form as shown in Fig. 2. As there shown, all of the elements of the circuit heretofore described and shown in Fig. 1, with exception of the neon bulb 16, are housed within the case 20. This may be any suitable metal or plastic structure and preferably is provided with a handle 21.

The test lamp 16 may be mounted at one end of a long cone or preferably, as shown, mounted in a short viewer 22 having prismatic ophthalmic lenses 23 mounted so as to permit the viewing of the test field at a conveniently reduced distance. The test lamp, as shown, is connected by an electrical extension cord 24 to the case 20 by the plug 25.

The provision of a separate viewer housing the test lamp has the advantage of being capable of use on a group of subjects in close quarters since it may readily be passed from individual to individual allowing the operator to occupy a fixed position.

Figure 3:
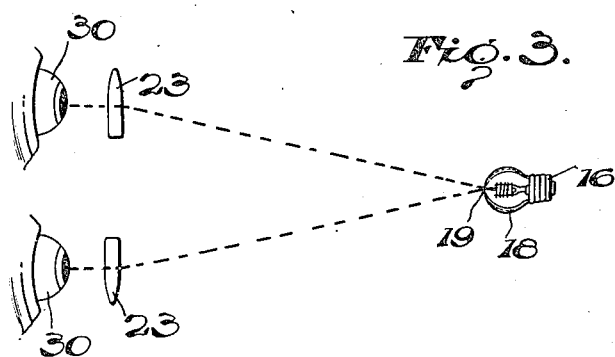
Fig. 3 is a diagrammatic view of the optical system of the light source.

The optical arrangement of the viewer is shown diagrammatically in Fig. 3, in which the two eyes 30 are represented looking at the test field 19 through prismatic ophthalmic lenses 23. The use of the prismatic lenses permits the construction of a shorter and lighter viewer. This reduction in length and weight allows the viewer to be more conveniently handled and held more steadily before the eyes. This is particularly important when tests are conducted in which the subject becomes unsteady, for example, by reason of anoxia, or where the test is made in a vibrating vehicle such as in an airplane.

It will be understood that the particular viewing unit may be widely modified. For example, in lieu of employing a viewing unit which utilizes a single test field such as that shown in Fig. 2, such unit may comprise a pair of test fields each of which is associated with its respective ophthalmic lenses. An advantage of this structure is that it foreshortens the necessary distance between the test field and the eye and thus conduces to a small convenient and compact structure.

The power supply 1 may be plugged into any 110 volt line by means of a cord and plug not shown. There is shown at 26 a switch for controlling the power supply to the circuit which is indicated by pilot light 27. The selector switch 28 for controlling the flicker frequency of the test field is located on the front panel and is associated with dial 29 which is calibrated to read from 30 to 60 impulses per second. The variable resistors 11, 12 and 13 are controlled by the knobs 31, 32 and 33 respectively.

The use of a neon lamp to establish a test field for the determination of the flicker fusion threshold has several definite advantages. The light intensity of the lamp is within a suitable range and its color being red has the advantage of affecting the rods and cones of the retina of the eye to approximately the same extent. If the test field is restricted in the manner described to about two degrees of arc and is focused upon the fovea of the retina which in most individuals is populated only by cones, it will be obvious that a slight deviation of the test field from the fovea due to eye motion will result in little if any change in the flicker fusion threshold. This result is best obtained by the use of red light since there is a marked difference in the flicker fusion threshold of the rods and cones for white light and all other colors.

As previously pointed out the state of adaptation of the eye to light is one of the factors which affects the flicker fusion threshold. In order to obtain uniform results it is customary to have the eyes adapted to the level of the light intensity of lamp employed for the test field.

The use of the apparatus of the invention will be appreciated from the foregoing description. It is only necessary to keep the subject in a semi-lighted room for the requisite period of time to adapt his eyes to the level of light intensity of the test field. For certain determinations a period of 3 to 5 minutes is adequate. The subject places the viewer 22 before his eyes and is instructed by the operator as to the appearance of flickering and steady test fields by setting the flicker frequency below and above the subject's flicker fusion threshold by adjusting switch 28. The test field frequency is then made to approach the flicker fusion threshold. When the subject indicates the transition from a flickering to a steady test field or vice versa brought about by a small change in frequency, usually about one flicker per second, this point is taken as the flicker fusion threshold. While a preferred embodiment of the invention has been described it is to be understood that this is given didactically to explain the underlying principles and not as limiting the useful application to the particular illustrative embodiment.

The invention herein described may be manufactured and used by or for the Government of the United States of America for governmental purposes without the payment of any royalties thereon or therefor.

We claim:

A flicker fusion testing apparatus comprising a portable case, a multivibrator having an input and an output circuit, mounted within the case, a double triode tube mounted within the case, means to connect one grid of the double triode tube to a 60 cycle power line, means to apply pulses from the multivibrator to the other grid of the double triode, means to indicate the resulting beat frequency of the double triode tube including an electron ray indicator connected to the plate circuit of the double triode, means including manual adjustable resistors associated with the multivibrator and operable to control the output frequency of the multivibrator, the frequency of the flashes of the indicator being varied correspondingly to the variations of the output circuit of the multivibrator.

RUPERT H. DRAEGER.
HERBERT FRIEDMAN.

REFERENCES CITED

The following references are of record in the file of this patent:

UNITED STATES PATENTS

| Number | Name | Date |
|---|---|---|
| 607,171 | Hill | July 12, 1898 |
| 1,506,524 | Hammond | Aug. 26, 1924 |
| 1,717,785 | Kaehni et al. | June 18, 1929 |
| 1,775,987 | Clement | Sept. 16, 1930 |
| 1,828,777 | Leventhal | Oct. 27, 1931 |
| 1,963,788 | Harlow | June 19, 1934 |
| 1,967,892 | Leibing | July 24, 1934 |
| 1,979,692 | Knowles | Nov. 6, 1934 |
| 1,981,587 | Dorsey | Nov. 20, 1934 |
| 2,132,654 | Smith | Oct. 11, 1938 |
| 2,136,924 | Reitherman | Nov. 15, 1938 |
| 2,181,879 | Edgerton | Dec. 5, 1939 |
| 2,201,978 | Bedford | May 28, 1940 |
| 2,239,164 | Wigelsworth | Apr. 22, 1941 |
| 2,245,717 | Roberts | June 17, 1941 |
| 2,315,945 | Downey | Apr. 6, 1943 |
| 2,331,317 | Germeshausen | Oct. 12, 1943 |
| 2,344,037 | Fuller | Mar. 14, 1944 |
| 2,358,127 | Hermansen | Sept. 12, 1944 |

FOREIGN PATENTS

| Number | Country | Date |
|---|---|---|
| 439,375 | Great Britain | Dec. 5, 1935 |
| 439,979 | Great Britain | Dec. 18, 1935 |
| 449,470 | Great Britain | June 24, 1936 |

OTHER REFERENCES

Journal of General Physiology, article by Hecht et al., vol. 17, 1933, 1934, pages 237 to 248, inc.

Journal of General Physiology, article by Hecht et al., vol. 19, 1935, 1936, pages 965 to 968, inc.

American Journal of Ophthalmology, article by Mayer, vol. 20, 1937, pages 828 to 830, inc.

Journal of Optical Society of America, article by Wald, March 1941, vol. 31, pages 235 to 237, inc.